US005414237A

United States Patent [19]

Carkhuff

[11] Patent Number: 5,414,237

[45] Date of Patent: May 9, 1995

[54] PLASMA ARC TORCH WITH INTEGRAL GAS EXCHANGE

[75] Inventor: Donald W. Carkhuff, Florence, S.C.

[73] Assignee: The ESAB Group, Inc., Florence, S.C.

[21] Appl. No.: 136,974

[22] Filed: Oct. 14, 1993

[51] Int. Cl.[6] .............................................. B23K 10/00

[52] U.S. Cl. .......................... 219/121.51; 219/121.55; 219/121.48; 219/75

[58] Field of Search ........... 219/121.48, 121.5, 121.51, 219/121.55, 74, 75, 121.49

[56] References Cited

U.S. PATENT DOCUMENTS

| | | | |
|---|---|---|---|
| 3,198,932 | 8/1965 | Weatherly | 219/121.52 |
| 3,634,643 | 1/1972 | Himmelman | 219/75 |
| 3,988,566 | 10/1976 | Vogts et al. | 219/121.55 |
| 4,311,897 | 1/1982 | Yerushalmy | 219/121.5 |
| 4,521,666 | 6/1985 | Severance, Jr. et al. | 219/121.59 |
| 4,954,688 | 9/1990 | Winterfeldt | 219/121.5 |
| 5,013,885 | 5/1991 | Carkhuff et al. | 219/121.5 |
| 5,017,752 | 5/1991 | Severance, Jr. et al. | 219/121.59 |
| 5,023,425 | 6/1991 | Severance, Jr. | 219/121.59 |
| 5,097,111 | 3/1992 | Severance, Jr. | 219/121.52 |
| 5,170,033 | 12/1992 | Couch, Jr. et al. | 219/121.51 |
| 5,235,155 | 8/1993 | Yamada et al. | 219/121.39 |
| 5,258,599 | 11/1993 | Moerke | 219/121.48 |

*Primary Examiner*—Mark H. Paschall
*Attorney, Agent, or Firm*—Bell, Seltzer, Park & Gibson

[57] ABSTRACT

A plasma arc torch for minimizing delay in exchanging gases within the torch. The torch includes a metallic electrode, a conductive nozzle spaced apart from the electrode, and a gas plenum between the electrode and nozzle. Two gas passageways are provided for communicating non-oxidizing and oxidizing gases into the plenum. A plenum inlet check valve is associated with each gas passageway and is located in close proximity to the plenum. The check valves are normally biased in a closed position but may be opened by gas pressure within the passageways to selectively introduce gas into the plenum. Solenoid valves located upstream of the plenum check valves regulate the pressure and flow of gas within the passageways so as to open and close the plenum check valves. Pilot arc and main arc power supplies are provided for generating an arc between the electrode and nozzle while the non-oxidizing gas flows through the plenum and for transferring the arc and sustaining it between the electrode and workpiece when oxidizing gas is introduced into the plenum. Operation of the check valves and power supplies is coordinated so that the oxidizing and non-oxidizing gases are exchanged substantially simultaneously with transfer or termination of the arc.

13 Claims, 4 Drawing Sheets

PLASMA ARC TORCH WITH INTEGRAL GAS EXCHANGE

FIELD OF THE INVENTION

The present invention relates to plasma arc torches, and more particularly, to apparatus for exchanging oxidizing and non-oxidizing gases within the torch.

BACKGROUND OF THE INVENTION

Plasma arc torches generally include a metallic electrode and a nozzle assembly positioned adjacent the discharge end of the electrode. These torches typically operate in a transferred arc mode in which an arc extends from the discharge end of the electrode through the nozzle to a workpiece. An oxidizing gas is normally used in the torch for improved plasma generation and for facilitating faster and more efficient cutting of the workpiece.

Due to the high voltages required for starting and transferring the arc from the electrode to the workpiece, some plasma arc torches have been started by creating a pilot arc between the discharge end of the electrode and the nozzle assembly. During this starting step, the gas plenum of the torch is often flooded with a non-oxidizing gas so as to reduce the oxidation conditions that would otherwise reduce the effective life of the electrode due to the high voltages that are imposed between the electrode and nozzle assembly. After the torch has been started, the arc between the electrode and nozzle assembly is then transferred to the workpiece. The flow of non-oxidizing gas is also then reduced, and an oxidizing gas such as oxygen is added to the flow of the non-oxidizing gas for improved cutting.

Generally, the aforementioned prior art method of torch starting requires careful control and timing of the gas flow. In some torches, a special torch structure is required. For example, in one prior art torch design, argon flows through multiple annular gas ports positioned between two nozzle members during initial arc starting. After the arc has transferred to the workpiece, some argon flow in the gas ports is terminated and is substituted with a flow of oxidizing gas so that during the transferred torch operation, a reduced flow of argon is mixed with an oxidizing gas. This use of a combination of argon and oxygen, or air, within the torch necessitates simultaneous, complex control over two different gas flows for maintaining proper mixing and operation of the torch. Additionally, use of a non-oxidizing gas such as argon, in combination with an oxidizing gas such as oxygen or air, may result in increased formation of dross, which is undesired.

One prior art torch starting process is described in U.S. Pat. No. 5,017,752, issued to Severance, Jr., et al. on May 21, 1991 and assigned to ESAB Welding Products, Inc., entitled "Plasma Arc Torch Starting Process Having Separate Generated Flows of Non-Oxidizing and Oxidizing Gas." As illustrated schematically in FIG. 2 herein, the prior art apparatus and method as shown in the Severance, Jr. '752 patent includes a torch in which an oxidizing gas such as oxygen ($O_2$) and a non-oxidizing gas such as Nitrogen ($N_2$), may be selectively introduced into the torch body via a pair of normally closed solenoid valves V. A gas feed line directs the oxidizing or non-oxidizing gas from the solenoid valves to the gas plenum at the tip of the torch. Thus, as described in the Severance, Jr. '752 patent, the solenoid valves V may be engaged first to introduce a non-oxidizing gas $N_2$ into the gas plenum of the torch for starting. Thereafter, the solenoid valve V controlling the non-oxidizing gas $N_2$ may be closed, and the valve V controlling the oxidizing gas $O_2$ is opened, thereby substituting one gas for the other when the cutting stage is initiated. The respective valves V may also be opened and closed as appropriate to exchange the non-oxidizing gas for the oxidizing gas at the end of a cut and to purge the oxidizing gas from the torch to prepare for a successive starting of the torch to initiate another cut.

One limitation of the prior art apparatus and method shown in FIG. 2 and described in the Severance, Jr., et al. '752 patent is the time delay or lag that is inherent in exchanging (or purging) the gases $O_2$ and $N_2$ from the torch. This time delay or lag is due to the volume of gas contained within the tubing and passageways extending between the solenoid valves V and the gas plenum adjacent the electrode and torch nozzle assembly. All of the undesired gas to be purged must be ejected through the nozzle of the torch, which is a time consuming process dependent on the size of the nozzle orifice, the length and volume of the gas tubing, gas passageways and plenum, the rate of flow of new gas into the tubing, passageways and plenum, and the rate of flow of the purged gas through the nozzle orifice.

Often, the size of the nozzle orifice is the limiting factor. For example, in low current torches, typically operating at between 15 and 100 amperes, the nozzle orifice is usually very small. The gas flow pattern through these lower current torches may therefore be restricted, and purging delayed, due to the small nozzle orifice. Consequently, the time required to purge one gas in favor of the other is greater. This problem may be less severe in relatively high current torches (e.g., those torches operating at over 100 amperes, and possibly 150 amperes or higher) which have relatively large nozzle orifices.

An example of the time delay associated with purging in the apparatus shown in the Severance '752 patent is illustrated in FIG. 4 herein. Each of the four graphs in FIG. 4 is plotted concurrently as to time. The various graphs represent, from top to bottom, gas flow at the solenoid valves V where the oxidizing and non-oxidizing gases are exchanged; the arc current initiated by the power supply; gas flow at the torch nozzle; and the cut that is effectuated by operation of the torch.

By comparing the top (valve) gas flow graph in FIG. 4 to the lower (nozzle) gas flow graph, it is readily apparent that a time period, or lag, "A" is inherent when the non-oxidizing and oxidizing gases are exchanged. For example, when the non-oxidizing control solenoid valve V is opened and a quantity of $N_2$ introduced into the supply tubing, some time is required for the newly admitted $N_2$ to reach the torch nozzle. The same time delay situation exists when the flow of the non-oxidizing gas $N_2$ is stopped and the flow of oxidizing gas $O_2$ is initiated, and again, when the $O_2$ flow is stopped at the end of cutting cycle and the non-oxidizing gas $N_2$ is reintroduced into the torch. As previously noted, the amount of the time lag "A" is directly proportional to the length of the gas feed line extending from the solenoid valves V to the gas plenum of the torch, and further, to the rate of gas flow through the feed lines.

While the problem of the time lag "A" might be solved, at least in part, by adjusting the timing of the opening and closing of the solenoid valves V in a predetermined relationship in advance of initiating a new cut or engagement of the arc current, such timing requires careful adjustment, as in the timing of gas introduction found in some prior art apparatus. The need for accurate advance timing also makes the torch apparatus more complex and its operation more difficult. Also, if a torch is operated for cuts that are not of predetermined duration, the inherent time lag following termination of the cutting arc cannot be overcome if the oxidizing gas is to be fed to the torch throughout the cutting step. Such inherent lag may be especially problematic when it is desired to advance rapidly between successive cuts, since the time lag required to completely purge the oxidizing gas from the torch nozzle is the minimum time delay that can exist between the successive cuts. As shown clearly in FIG. 4, the time lag "A" associated with the post-cut flow of the non-oxidizing gas $N_2$ will exist if the flow of oxidizing gas $O_2$ continues throughout the end of the cut.

It is therefore an object of the present invention to provide a plasma arc torch in which undesired oxidation is minimized by providing a flow of non-oxidizing gas during pilot arc generation and which further minimizes the lag time associated with introduction of the non-oxidizing or oxidizing gas in the gas plenum of the torch.

It is a further object of the invention to provide a plasma arc torch in which the time delay between successive cuts is reduced for rapid cut indexing.

Another object of the invention is to provide a plasma arc torch in which the time lag associated with exchange and purging of oxidizing and non-oxidizing gases is minimized without resort to complex advance timing of the actuation of gas control valves.

Yet another object of the invention is to provide a plasma arc torch in which pierce quality is enhanced.

SUMMARY OF THE INVENTION

The above and other objects and advantages of the present invention are achieved in the embodiment disclosed herein of a plasma arc torch of the type having a metallic electrode with a discharge end, an electrically conductive nozzle assembly spaced apart from the discharge end of the electrode, and a gas plenum defined between the discharge end of the electrode and the conductive nozzle assembly. The torch includes a first gas passageway for communicating a non-oxidizing gas into the plenum and a second gas passageway for communicating an oxidizing gas into the plenum. A first plenum inlet valve is associated with the first gas passageway and a second plenum inlet valve is associated with the second gas passageway. Each plenum inlet valve is located in close proximity to the plenum and is operable between a closed position for preventing gas flow from the associated passageway into the plenum and an open position for allowing gas flow from the associated passageway into the plenum. One of the plenum inlet valves may be opened substantially concurrently with closing of the other plenum inlet valve so as to selectively introduce either the oxidizing or non-oxidizing gas into the gas plenum and to rapidly purge a preexisting gas from the plenum. In one preferred embodiment, the first and second plenum inlet valves are check valves that have a sealing member biased against a sealing element in a normally closed position for preventing gas flow but which may be opened by gas pressure within the associated gas passageways. The sealing member may be a ball that is biased against the sealing member by a spring. Also in a preferred embodiment, the plasma arc torch may include a solenoid valve associated with each gas passageway. Each of the solenoid valves are located upstream of the plenum check valves so as to regulate the pressure and flow of gas within the gas passageways. The solenoid valves are preferably operable between a normally closed position, an exhaust position and an open position for allowing gas to flow into the gas passageways. Means such as a pilot arc power supply may also be provided for generating an arc between the electrode and the conductive nozzle assembly while the plenum inlet valves selectively allow a flow of non-oxidizing gas into the plenum. Means such as a main arc power supply are likewise provided for transferring the arc from the nozzle assembly to a workpiece and for sustaining the arc between the electrode and the workpiece. The means for transferring and sustaining the arc may operate at a current of less than about 100 amperes. Also included are means, such as the solenoid valves, for actuating the plenum inlet valves substantially concurrently with transfer of the arc to selectively allow oxidizing gas into the plenum and to rapidly purge non-oxidizing gas from the plenum. Means for terminating the arc between the electrode and the workpiece, and means such as the solenoid valves for actuating the plenum inlet valves substantially concurrently with termination of the arc, selectively allow non-oxidizing gas to flow into the plenum and rapidly purge oxidizing gas from the plenum at the end of a cut.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate prior art apparatus and a preferred and exemplary embodiment of the invention, and wherein.

DETAILED DESCRIPTION OF THE PREFERRED EMBODIMENT

Figure 1:
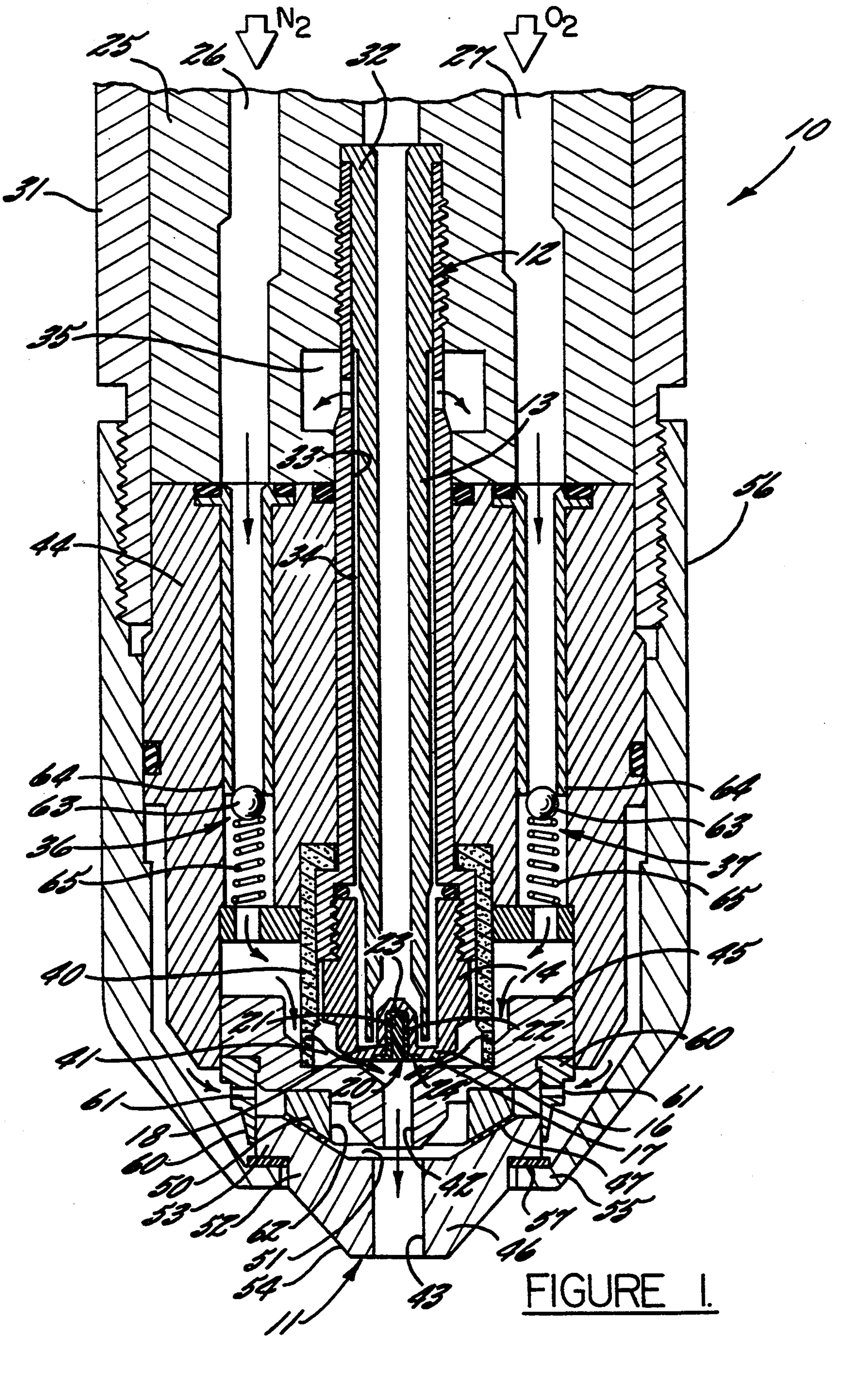
FIG. 1 is a sectioned side elevational view of a plasma arc torch which embodies the present invention.
Figure 2:
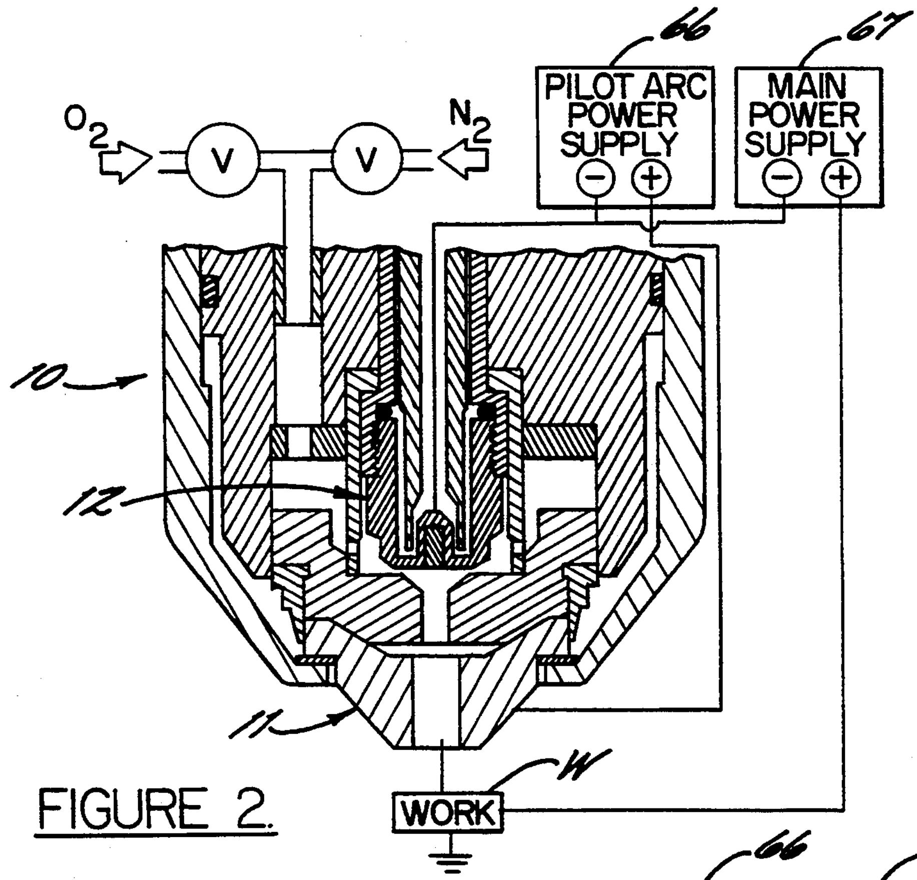
FIG. 2 is a partially schematic, partially sectioned side elevational view of one prior art plasma arc torch.

Referring now to the drawings, and more particularly to FIG. 1, there is illustrated one type of plasma arc torch 10 made in accordance with present invention. The plasma arc torch 10 includes a nozzle assembly 11 and a tubular electrode 12. The electrode 12 is preferably made of copper or a copper alloy, and includes an upper tubular member 13 and a lower, cup-shaped member or holder 14. The upper tubular member 13 is of elongate open tubular construction and defines the longitudinal axis of the torch 10. The upper tubular member 13 also includes an internally threaded lower end portion 15.

The lower, cup-shaped member or holder 14 is also of a tubular construction and includes a lower front end and an upper rear end. A transverse end wall 16 closes the front end of the holder 14 and defines an outer front face 17 of the electrode 12. The rear end of the holder 14 is externally threaded and is joined to the lower end portion 15 of the upper tubular member 13.

A cavity 18 is formed in the front face 17 of the end wall 16 and extends rearwardly along the longitudinal axis of the torch 10. An insert assembly 20 is mounted in the cavity 18 and comprises a generally cylindrical emissive insert 21 which is disposed coaxially along the longitudinal axis of the torch 20. The emissive insert 21 is composed of a metallic material which has a relatively low work function so that it is adapted to readily emit electrons upon application of an electrical potential. Suitable examples of such materials are hafnium, zirconium, tungsten and alloys thereof.

A relatively non-emissive sleeve 22 is positioned in the cavity 18 coaxially about the emissive insert 21 with the sleeve 22 having a peripheral wall and a closed bottom wall 23 which are metallurgically bonded to the walls of the cavity 18. The sleeve 22 includes an annular flange 24 which lies in the plane of the front face 17 of the holder 14.

In the embodiment illustrated in FIG. 1, the electrode 12 is mounted in a plasma arc torch body 25 which includes a plurality of gas passageways 26 and 27. A liquid passageway (not shown) leads through the torch body 25 to the liquid feed chamber 30. The torch body 25 is surrounded by an outer insulated housing member 31.

A tube 32 is suspended within the central bore 33 of the tubular electrode 12 for circulating a liquid medium such as water through the electrode 12. The tube 32 is of a diameter smaller than the diameter of the bore 33 so as to provide a space 34 for the water to flow upon discharge from the tube 32. The water flows from a source (not shown) through the tube 32 and back through the space 34 to the opening 35 in the torch body 25 and further to a drain hose (not shown).

The passageway leading to the liquid feed chamber 30 directs injection water into the nozzle assembly 11 where it is converted into a swirling vortex for surrounding the plasma arc. The gas passageways 26 and 27 receive non-oxidizing and oxidizing gases from suitable sources (not shown) which, in accordance with the present invention, include a source of a non-oxidizing gas, preferably Nitrogen ($N_2$), and a source of an oxidizing gas, preferably Oxygen ($O_2$). Alternatively, air may be used as the oxidizing gas. In the preferred embodiment, the first gas passageway 26 is devoted exclusively to introduction of the non-oxidizing gas $N_2$, while the second gas passageway 27 is devoted exclusively to introduction of the oxidizing gas $O_2$.

It has been found advantageous to start a plasma arc torch in the presence of a non-oxidizing gas so as to eliminate the problems of oxygen fires starting in the torch due to arcing between torch parts. Likewise, in the event a fire does occur instantaneously, the post-flow of non-oxidizing gas may serve to extinguish the fire within the torch. Also, erosion of the copper nozzle is greatly reduced, which significantly extends the longevity of the nozzle and which enhances and prolongs starting and cut quality. Likewise, oxidation of any copper portions of the electrode is greatly reduced.

The non-oxidizing and oxidizing gases flowing through the passageways 26 and 27, respectively, pass through the plenum inlet valves 36 and 37, which may be check valves. The gases then flow through a conventional gas baffle 40 which may be made of any suitable high temperature ceramic material, and further into the gas plenum chamber 41. The valves 36 and 37 are positioned within the internal torch structure in close proximity to the gas plenum. The gas then flows from the plenum chamber 41 through the arc constricting coaxial bores 42 and 43 of the nozzle assembly 11. The electrode 12 holds the ceramic gas baffle 40 in place, along with a high temperature insulating member 44 which may be made of plastic. The member 44 electrically insulates the nozzle assembly 11 from the electrode 12.

The nozzle assembly 11 comprises an upper nozzle member 45 and a lower nozzle member 46. The upper and lower members 45 and 46 include the first and second arc constricting nozzle bores 42 and 43, respectively. The upper and lower nozzle members 45 and 46 may be metal; however, a ceramic material such as alumina is preferred for the lower nozzle member 46. The lower nozzle member 46 is separated from the upper nozzle member 45 by an insulative spacer element 47, which may be plastic, and is further separated by a water swirl ring 50. The space provided between the upper nozzle member 45 and the lower nozzle member 46 forms a water chamber 51. The bore 42 of the upper nozzle member 45 is in axial alignment with the longitudinal axis of the torch electrode 12. Also, the bore 42 is cylindrical, and it has a chamfered upper end adjacent the gas plenum chamber 41. Preferably, the chamfer angle is about 45°.

The lower nozzle member 46 comprises a cylindrical body portion 52 which defines a forward (or lower) end portion and a rearward (or upper) end portion. The bore 43 extends coaxially through the body portion 52 of the lower nozzle member 46. An annular mounting flange 53 is positioned on the rearward end portion of the nozzle member 46, and a frustro-conical surface 54 is formed on the exterior of the forward end portion of the lower nozzle member 46 so as to be coaxial with the second bore 43. The annular flange 53 is supported from below by an inwardly directed flange 55 at the lower end of the cup 56. The cup 56 is detachably mounted by interconnecting threads of the outer housing member 31. Also, a gasket 57 is disposed between the two flanges 53 and 55.

The arc constricting bore 43 and the lower nozzle member 46 are cylindrical and are maintained in axial alignment with the arc constricting bore 42 of the upper nozzle member 45 by a centering sleeve 60, which is preferably made of a plastic material. The centering sleeve 60 has a lip at the upper end thereof which is detachably locked into an annular notch in the upper nozzle member 45. The centering sleeve 60 extends from the upper nozzle member 45 and is in biased engagement against the lower nozzle member 46. The swirl ring 50 and spacer element 47 are assembled prior to insertion of the lower member 46 into the sleeve 60.

Water flows from the passageway (not shown) through the liquid feed chamber 30, through openings 61 in the sleeve 60, and further to the injection ports 62 in the swirl ring 50. The ports 62 inject the water into the water chamber 51. The ports 62 are tangentially disposed around the swirl ring 50 so as to cause the water to form a vortical pattern in the water chamber 51. The water exits the water chamber 51 through the arc constricting bore 43 in the lower nozzle member 46.

Flow of the non-oxidizing and oxidizing gases through the passageways 26 and 27 is controlled by the miniature check valves 36 and 37, respectively. In the preferred embodiment, the check valves 36 and 37 include seating members, preferably balls 63, that are restrained against seating elements 64 by springs 65. The springs 65 bias the balls 63 against the seating elements 64 so as to restrict the gas flow through the respective passageway 26 or 27. When the pressure of the gas within one of the passageways 26 or 27 rises beyond a predetermined limit, the respective ball 63 is forced away from the associated seating element 64 to allow the gas to flow through the passageway and into the gas plenum chamber 41, as illustrated by arrows in FIG. 1.

Figure 3:
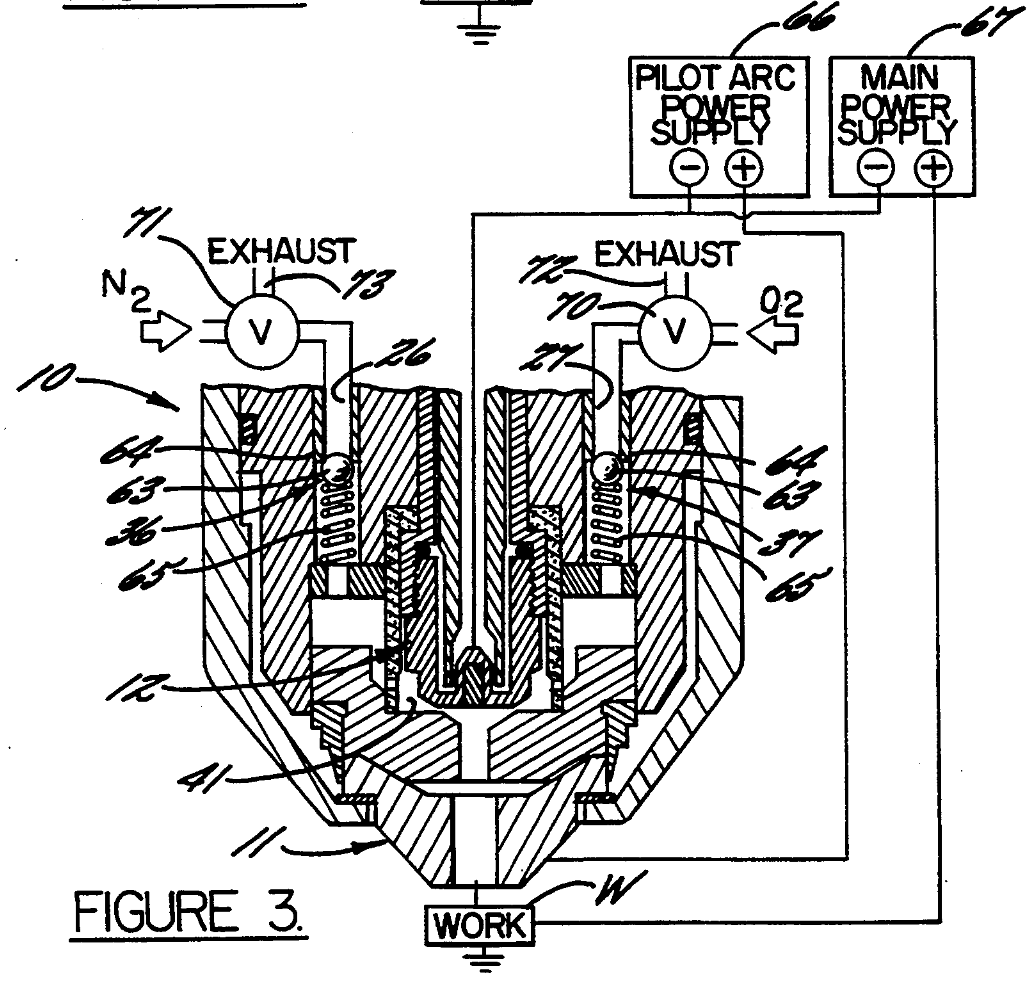
FIG. 3 is a partially schematic, partially sectioned side elevational view of a plasma arc torch made in accordance with the present invention.

Referring now to FIG. 3, the plasma arc torch 10 is illustrated in conjunction with a schematic representation of the gas supply, the power supply and a workpiece W. A pilot arc power supply 66 is connected to the nozzle assembly 11 and electrode 12. Also, a main power supply 67 is connected to the electrode 12 and a metal workpiece W, which is typically grounded. A switch means (not shown) which may be in the form a toggle switch positioned on the torch or at any other convenient location, may control actuation of the initial pilot arc.

The oxidizing gas $O_2$ and the non-oxidizing gas $N_2$ each are provided from suitable sources (not shown). The gases are separately supplied to three way solenoid valves 70 and 71. Thus, the solenoid valve 70 may open to permit the oxidizing gas to pass from the source to the gas passageway 27 or alternatively, to an exhaust 72; however, the valve 70 may remain in its normally closed position. Likewise, the solenoid valve 71 may remain in a normally closed position, or may permit the non-oxidizing gas to pass from the source to the passageway 26 or to an exhaust 73.

When the oxidizing gas $O_2$ is introduced into the passageway 27, the gas pressure in the passageway 27 is increased so as to force the ball 63 of the internal gas check valve 37 into an open position. Thus, the non-oxidizing gas passes through the check valve 37 and into the gas plenum chamber 41. Introduction of the oxidizing gas $O_2$ through the check valve 37 and into the gas plenum 41 purges any remaining non-oxidizing gas or other matter still remaining in the gas plenum 41. Likewise, introduction of a non-oxidizing gas $N_2$ through the check valve 36 and into the gas plenum 41 purges any remaining quantity of oxidizing gas 02 from the gas plenum chamber 41. Since the check valves 36, 37 are located in close proximity to the gas plenum chamber 41 and the nozzle assembly 11, the volume of the area within the torch which must be purged is relatively small. Thus, the time lag associated with purging any remaining undesired gas from the plenum 41 is also relatively small.

The three way solenoid vales 70 and 71 are preferable to two-way solenoid valves in accurately regulating the pressure of the gases in the passageways 26 and 27 so that opening and closing of the miniature internal check valves 36 and 37 may be accurately controlled.

Figure 5:
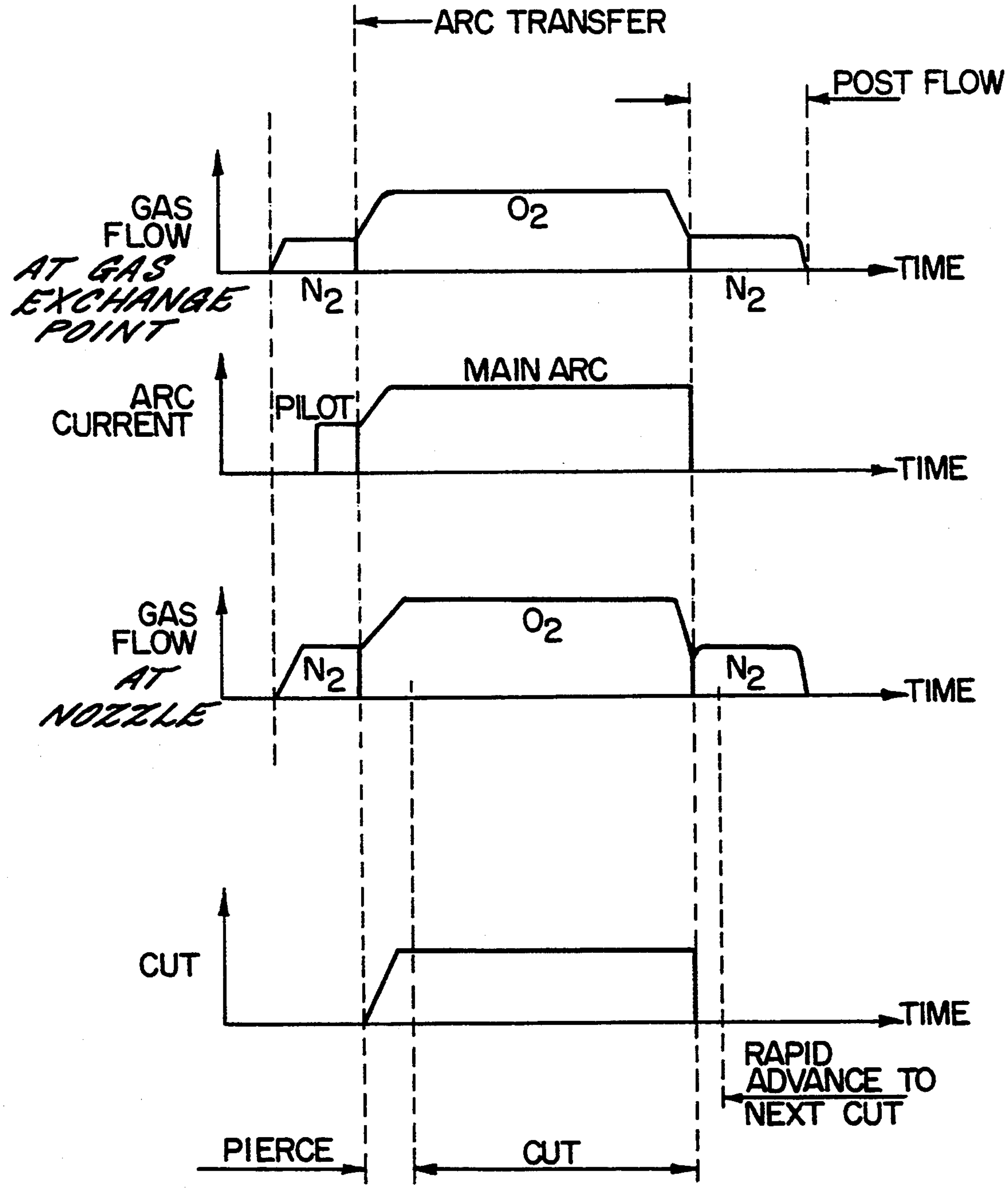
FIG. 5 shows four graphs which represent gas flow, arc current and cut in a plasma arc torch made in accordance with present invention.

FIG. 5 shows four graphs depicting operation of the plasma arc torch made in accordance with this invention. Each of these charts is plotted simultaneously as to time. The top chart represents gas flow at the point where the gases are exchanged, i.e., at the internal gas check valves 36 and 37. The arc current is plotted in the second graph, and gas flow at the nozzle is plotted in the third graph. Finally, the cut made by the plasma arc torch is plotted in the fourth graph.

Still referring to FIG. 5 and with further reference to FIG. 3, opening of the solenoid valve 71 causes the first internal gas check valve 36 to open so that a supply of non-oxidizing gas $N_2$ passes through the check valve 36. Almost immediately, the supply of $N_2$ enters the gas plenum 41. Once the supply of $N_2$ in the gas plenum 41 has been established, the pilot arc power supply 66 may be engaged to set up a pilot arc current between the electrode 12 and nozzle assembly Shortly thereafter, the flow of oxidizing gas $O_2$ is commenced by opening the solenoid valve 70. The resultant increased pressure in the passageway 27 forces the second check valve 37 to open so that the oxidizing gas flows into the gas plenum 41. The solenoid valve 71 is simultaneously closed, which allows the internal check valve 36 also to close such that the ball 63 is again seated against the seating element 64. Since the space to be purged is small, the flow of $O_2$ is almost immediately introduced into the gas plenum 41 which results in rapid expulsion of any remaining non-oxidizing gas $N_2$ from the plenum 41. Also at this point, the main arc power supply 67 is engaged to set up an enhanced arc current as illustrated in FIG. 5. The arc is thus transferred from the nozzle and on to the workpiece W through the arc constricting bores 42 and 43 of the upper and lower nozzle members 46 and 45. The transferred arc and the oxidizing gas $O_2$ create a plasma gas flow from the electrode 12, through the nozzle assembly 11 and to the workpiece W. Thus, once the flow of $O_2$ is initiated and the main arc current established, the torch is in full cutting operation.

Each arc constricting bore 42 and 43 contributes to the intensification and collimation of the arc. Water is discharged into the chamber 51 where it is converted into a swirling vortex for surrounding the plasma arc.

At the end of the cutting operation, the circuit between the electrode 12, workpiece W and main power supply 67 may be opened, thus terminating the arc current. The $O_2$ is also terminated and a post-cut flow of non-oxidizing gas $N_2$ is established by cooperative function of the solenoid valves 70 and 71 and the internal check valves 36 and 37.

Figure 4:
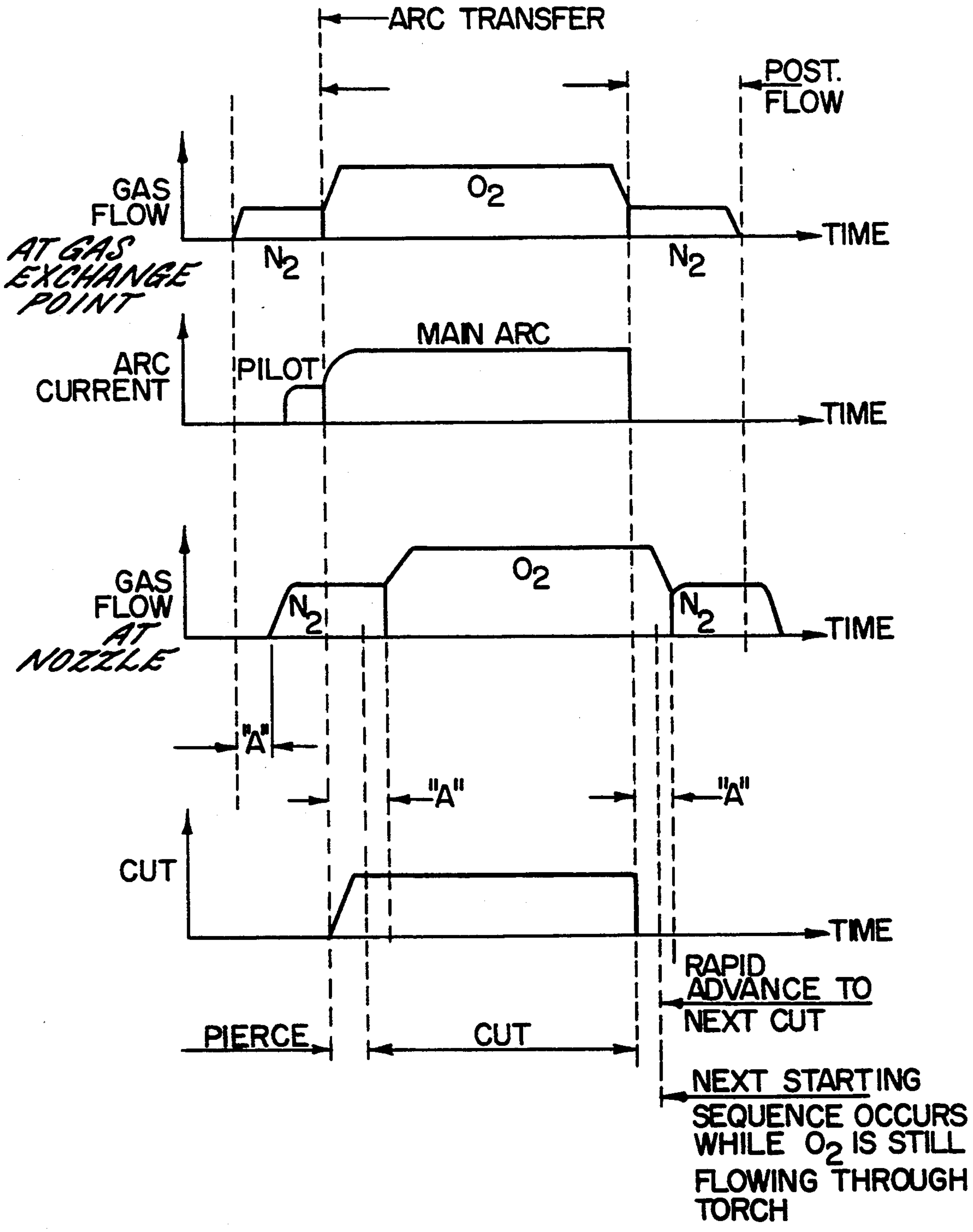
FIG. 4 shows four graphs which represent gas flow, arc current and cut in the prior art plasma arc torch illustrated in FIG. 2.

By comparing FIGS. 4 and 5, it is apparent that the present invention eliminates any significant time lag "A" as had been encountered in prior art torches. Thus, the torch may be advanced rapidly from a first cut to a successive cut, and pierce quality at the beginning of each cut is increased.

In the drawings and specification, there has been disclosed a typical preferred embodiment of the invention. Although specific terms have been employed, they have been used in a generic and descriptive sense only and not for purposes of limitation, the scope of the invention being set forth in the following claims.

What is claimed:

1. A plasma arc torch, comprising:

a torch body;

a metallic electrode having a discharge end mounted within said torch body;

an electrically conductive nozzle assembly mounted within said torch body, said nozzle assembly being spaced apart from said discharge end of said electrode;

a gas plenum defined between said discharge end of said electrode and said conductive nozzle assembly;

a first gas passageway for communicating a non-oxidizing gas into said plenum;

a second gas passageway for communicating an oxidizing gas into said plenum;

a first plenum inlet valve associated with said first gas passageway and a second plenum inlet valve associated with said second gas passageway, each said plenum inlet valve being mounted within said torch body in close proximity to said plenum and being operable between a closed position for preventing gas flow from said associated passageway into said plenum and an open position for allowing gas flow from said associated passageway into said plenum;

whereby one said plenum inlet valve may be opened substantially simultaneously with closing of the other said plenum inlet valve so as to selectively introduce either the oxidizing or non-oxidizing gas into said gas plenum and to rapidly purge a preexisting gas from the plenum.

2. A plasma arc torch as defined in claim 1 wherein each said first and second plenum inlet valve is a check valve having a sealing member biased against a sealing element in a normally closed position for preventing gas flow but which may be opened by gas pressure within said associated gas passageway.

3. A plasma arc torch as defined in claim 2 wherein said sealing member is a ball that is biased against said sealing member by a spring.

4. A plasma arc torch as defined in claim 2 further comprising a solenoid valve associated with each said first and second gas passageway, each said solenoid valve being located upstream of said first and second plenum check valves for regulating the pressure and flow of gas within said gas passageways.

5. A plasma arc torch as defined in claim 4 wherein each said solenoid valve is operable between a normally closed position, an exhaust position and an open position for allowing gas to flow into said gas passageways.

6. A plasma arc torch as defined in claim 1 further comprising:

means for generating an arc between said discharge end of said electrode and said conductive nozzle assembly while said plenum inlet valves selectively allow a flow of non-oxidizing gas into said plenum;

means for transferring the arc from said nozzle assembly to a workpiece and sustaining the arc between said electrode and the workpiece; and means for actuating said plenum inlet valves substantially concurrently with transfer of the arc so as to selectively allow oxidizing gas into said plenum and to rapidly purge non-oxidizing from said plenum.

7. A plasma arc torch as defined in claim 6 further comprising means for terminating the arc between said electrode and the workpiece, and means for actuating said plenum inlet valves substantially concurrently with termination of the arc so as to selectively allow non-oxidizing gas into said plenum and to rapidly purge oxidizing gas from said plenum.

8. A plasma arc torch as defined in claim 6 wherein said means for transferring and sustaining the arc operates at a current of less than about 100 amperes.

9. A plasma arc torch, comprising:

a torch body;

a metallic electrode having a discharge end mounted within said torch body;

an electrically conductive nozzle assembly mounted within said torch body, said nozzle assembly being spaced apart from said discharge end of said electrode;

a gas plenum defined between said discharge end of said electrode and said conductive nozzle assembly;

a first gas passageway for communicating a non-oxidizing gas into said plenum;

a second gas passageway for communicating an oxidizing gas into said plenum;

a first plenum inlet check valve associated with said first gas passageway and a second plenum inlet check valve associated with said second gas passageway, each said plenum inlet check valve being mounted within said torch body in close proximity to said plenum and having a sealing member biased against a sealing element in a normally closed position for preventing gas flow from said associated passageway into said plenum but which may be opened by gas pressure within said associated gas passageway for allowing gas flow from said associated passageway into said plenum; and a solenoid valve associated with each said first and second gas passageway, each said solenoid valve being located upstream of said first and second plenum check valves for regulating the pressure and flow of gas within said gas passageways;

whereby said solenoid valves may be actuated so as to cause one said plenum inlet check valve to open substantially simultaneously with closing of the other said plenum inlet valve so as to selectively introduce either the oxidizing or non-oxidizing gas into said gas plenum and to rapidly purge a preexisting gas from the plenum.

10. A plasma arc torch as defined in claim 9 wherein each said solenoid valve is operable between a normally closed position, an exhaust position and an open position for allowing gas to flow into said gas passageways.

11. A plasma arc torch as defined in claim 10 further comprising:

means for generating an arc between said discharge end of said electrode and said conductive nozzle assembly while said plenum inlet valves selectively allow a flow of non-oxidizing gas into said plenum;

means for transferring the arc from said nozzle assembly to a workpiece and sustaining the arc between said electrode and the workpiece; and means for actuating said plenum inlet valves substantially concurrently with transfer of the arc so as to selectively allow oxidizing gas into said plenum and to rapidly purge non-oxidizing gas from said plenum.

12. A plasma arc torch as defined in claim 11 further comprising means for terminating the arc between said electrode and the workpiece, and means for actuating said plenum inlet valves substantially concurrently with termination of the arc so as to selectively allow non-oxidizing gas into said plenum and to rapidly purge oxidizing gas from said plenum.

13. A plasma arc torch as defined in claim 12 wherein said means for transferring and sustaining the arc operates at a current of less than about 100 amperes.

* * * * *